(12) United States Patent
Renyer (10) Patent No.: US 8,573,917 B2
(45) Date of Patent: Nov. 5, 2013

(54) BULK SEED HANDLING SYSTEM

(75) Inventor: Jim Renyer, Sabetha, KS (US)

(73) Assignee: USC, L.L.C., Sabetha, KS (US)

( * ) Notice: Subject to any disclaimer, the term of this patent is extended or adjusted under 35 U.S.C. 154(b) by 790 days.

(21) Appl. No.: 12/192,620

(22) Filed: Aug. 15, 2008

(65) Prior Publication Data

US 2010/0040446 A1 Feb. 18, 2010

(51) Int. Cl.
*B60P 1/00* (2006.01)
(52) U.S. Cl.
USPC ........................................................ 414/523
(58) Field of Classification Search
USPC ............ 414/222.01, 287, 334, 406, 522, 523, 414/813; 222/185.1, 371; 198/311, 312, 198/314
See application file for complete search history.

(56) References Cited

U.S. PATENT DOCUMENTS

| | | | | | |
|---|---|---|---|---|---|
| 710,611 | A | * | 10/1902 | Ray | 414/504 |
| 710,811 | A | * | 10/1902 | Ray | 292/276 |
| 1,727,430 | A | * | 9/1929 | Gilkison | 280/763.1 |
| 2,107,682 | A | * | 2/1938 | Wall | 414/504 |
| 2,140,264 | A | * | 12/1938 | Kingham | 254/419 |
| 2,275,799 | A | * | 3/1942 | Oklejas | 414/523 |
| 2,293,486 | A | * | 8/1942 | Barrett | 414/523 |
| 2,352,129 | A | * | 6/1944 | Shonnard | 414/523 |
| 2,410,996 | A | * | 11/1946 | Patterson | 414/504 |
| 2,670,866 | A | * | 3/1954 | Glesby | 414/608 |
| 2,678,737 | A | * | 5/1954 | Mangrum | 414/495 |
| 3,454,251 | A | * | 7/1969 | Dye | 248/354.5 |
| 3,537,724 | A | * | 11/1970 | Matthews | 280/763.1 |
| 3,902,733 | A | * | 9/1975 | David | 280/47.18 |
| 4,313,708 | A | * | 2/1982 | Tiliakos | 414/498 |
| 4,956,821 | A | * | 9/1990 | Fenelon | 366/8 |
| 5,267,749 | A | * | 12/1993 | Hughes | 280/432 |
| 5,282,501 | A | * | 2/1994 | Miller, III | 144/4.6 |
| 5,339,996 | A | * | 8/1994 | Dubbert et al. | 222/185.1 |
| 5,360,097 | A | * | 11/1994 | Hibbs | 198/313 |
| 5,647,545 | A | * | 7/1997 | Conner | 241/79 |
| 6,089,603 | A | * | 7/2000 | Ackley | 280/765.1 |
| 6,092,974 | A | * | 7/2000 | Roth | 414/526 |
| 6,109,078 | A | * | 8/2000 | Marshall | 70/232 |
| 6,186,654 | B1 | * | 2/2001 | Gunteret al. | 366/18 |
| 7,188,842 | B2 | * | 3/2007 | Thorpe | 280/6.153 |
| 2002/0179024 | A1 | * | 12/2002 | Anderson et al. | 119/845 |
| 2004/0076501 | A1 | * | 4/2004 | McGill et al. | 414/607 |
| 2006/0180062 | A1 | * | 8/2006 | Furrer et al. | 111/171 |
| 2009/0035110 | A1 | * | 2/2009 | Woods, Jr. | 414/489 |
| 2010/0016047 | A1 | * | 1/2010 | Coers et al. | 460/114 |

\* cited by examiner

*Primary Examiner* — Saul Rodriguez
*Assistant Examiner* — Glenn Myers
(74) *Attorney, Agent, or Firm* — Hovey Williams LLP (57) ABSTRACT

A bulk seed handling system (20) is provided to facilitate seed transfer from a distributor to a farm and then to a planter or the like. The handling system (20) includes one or more upright bin assemblies (22) adapted to be moved in a filled condition, and a trailer (24) designed to move the bin assembly (22) and unload seed therefrom. The bin assembly (22) includes a seed bin (26) having a lower unload opening (34) and supported by a frame assembly (38) including telescopic legs (50) shiftable between a retractable travel position and an extended bin support position. The trailer (24) includes a lift frame (60) operable to engage and elevate the bin assembly (22) for travel with the legs (50) thereof in a retracted position, and a seed-conveying arrangement including an intermediate conveyor (62) and a delivery conveyor (64). At an unloading site, the intermediate conveyor (62) is shifted to an unloading position in communication with the bin unload opening (34) and the delivery conveyor (64) in order to transfer seed from the bin.

10 Claims, 11 Drawing Sheets

BULK SEED HANDLING SYSTEM

BACKGROUND OF THE INVENTION

1. Field of the Invention

The present invention is broadly concerned with handling systems for the efficient handling of particulate materials, and especially seeds. More particularly, the invention is concerned with such handling systems and corresponding methods, having one or more upright seed-holding bin assemblies and a specialized transport trailer for the transport and unloading of seed from the bin assemblies.

2. Description of the Prior Art

Commercial seed distributors and farmer-users must take special precautions when handling and transporting agricultural seeds. Of course, any substantial wetting of the seeds prior to planting can essentially ruin the product. Also, the seeds tend to be heavy in bulk, further complicating the seed handling issues. Traditionally, seeds have been packaged in individual bags which can be manually lifted and handled. Such seed bags have been delivered to a farmer and individually off-loaded. Thereupon, the farmer must load the bags onto a wagon or the like for transport to a usage site adjacent a field, where the bags must be individually opened and the seeds deposited in a planter or similar device. Such multiple handling steps are labor intensive and expensive. Moreover, each handling step increases the probability that a bag may be inadvertently torn with consequent seed loss.

Bulk handling equipment has been developed in the past for seeds or other particulate material such as fertilizer. For example, U.S. Pat. No. 3,478,968 discloses a bulk material handling system especially for fertilizers making use of a ground-supported bin which serves as both for storage and has a lower outlet allowing unloading of the bin. A trailer for the bins is also provided, having a single conveyor beneath the bin outlet and feeding an aft spreader. Use of such a single conveyor means that the loaded bin must be elevated off the ground to a considerable extent, thereby raising the center of gravity of the unit and subjecting it to possible toppling. Further, the bin assemblies are of relatively complex construction making them relatively expensive. Other bin and transport devices for various types of products are disclosed in the following references U.S. Patent Publication Nos. 2007/0083293; 2007/0005186; 2006/0180062; U.S. Pat. Nos. 6,994,039; 6,971,324; 6,092,974; 5,718,556; 4,917,560; 4,313,708; 3,490,632; 3,180,601; 2,678,738; and 2,678,737.

There is accordingly a need in the art for an improved bulk seed handling system which are capable of more efficiently storing, transporting, and unloading valuable agricultural seeds.

SUMMARY OF THE INVENTION

The present invention overcomes the problems outlined above by providing an improved bulk seed handling system, which greatly facilitates the transfer and handling of seed from a distributor to a farm, and then to a site such as a planter on the farm. In general, the system of the invention include a plurality of individual bin assemblies and a specialized transport trailer for use the bin assemblies.

In more detail, the transport trailer includes a lower wheeled frame, a lift frame operably coupled with the lower frame and selectively moveable between a lower position and an elevated position, the lift frame having structure for engaging and supporting a bin assembly in the elevated position thereof. The trailer also has a conveyor assembly operable to unload the particulate material from the bin assembly, comprising an intermediate conveyor having an inlet and an outlet, and a delivery conveyor having an inlet and an outlet. Structure is provided in order to support the intermediate conveyor for selective translatory movement of the inlet of the intermediate conveyor between a lower travel position and an extended conveying position where the intermediate conveyor inlet is below the bin lower outlet and the intermediate conveyor outlet communicates with the delivery conveyor inlet.

In preferred forms, the lift frame of the transport trailer includes fore and aft guides configured to engage frame assembly of a bin assembly, and the intermediate conveyor structure is operable to move the intermediate conveyor between the lower travel position wherein the outlet of the intermediate conveyor is spaced rearwardly of the fore guide, and the conveying position where the intermediate conveyor outlet is located above and spaced forwardly of the fore guide.

The bin assembly of the invention comprises a seed bin having an upper inlet and a lower outlet, and a frame assembly supporting the bin above a support surface and including a plurality of upright tubular leg mounts. A leg is telescopically received within each of the leg mounts and includes a lowermost pad pivotally coupled to each leg for engaging the support surface, and a telescopic arm pivotally coupled to each leg and the frame assembly. Each of the legs is spring biased upwardly and is shiftable within the corresponding mount between a retracted position and an extended position, the arm pivoting to accommodate such shifting movement of the leg. Locking structure is provided to alternately hold each of the legs in the retracted and extended positions thereof.

In use, one or more of the bin assemblies may be filled with seed and transported on a flatbed trailer, with the bin assembly legs in the retraced position thereof. At a farm, the bin assembly legs are extended to engage the support surface and thereby elevate the bin assembly above the level of the trailer, which can then be driven off. When the farmer wishes to transport the seed, use is made of the specialized transport trailer. This involves backing the trailer beneath the bin assembly, and elevating the lift frame of the trailer to engage and elevate the bin assembly. The legs are then moved to the retracted position thereof allowing ready transport of the bin assembly. At an unloading site, the intermediate conveyor is shifted to the extended position thereof in operative communication with the outlet of the bin and the delivery conveyer, whereby the seed may be conveniently unloaded. The intermediate conveyor is then moved to its retracted travel position and the empty bin assembly can be returned to a pick-up location, whereupon the legs are again extended and the transport trailer is driven away from the bin assembly.

Use of a transport trailer having the dual-conveyor assembly minimizes the extent of elevation of a filled bin, creating a lower center of gravity and greater stability during transport of the filled bin. Also, the easily retracted legs of the bin assembly, and the ability to lock the legs in the extended and retracted positions thereof, makes it easy to alternate the position of the bin assembly during successive seed handling steps.

Although the invention has been particularly described in the context of seed handling, it will be understood that the methods and apparatus of the invention can be used in other contexts, e.g., delivery and handling of fertilizers. Generally speaking, the invention is suitable for handling of any particulate material which can be gravity-unloaded.

DETAILED DESCRIPTION OF THE PREFERRED EMBODIMENT

Turning to the drawings, a bulk seed handling system 20 broadly includes a seed bin 30 assembly 22 as well as a bin transport trailer 24. In general, the bin assembly 22 is designed to hold a quantity of bulk seed to be delivered to a farmer for example, whereas the trailer 24 is operable to pick up a loaded bin assembly 22, transport it to a field site adjacent a planter or the like, and to unload the seed into the planter. In this fashion, the handling problems associated with conventional methods are largely if not entirely overcome.

Figures 13, 14:
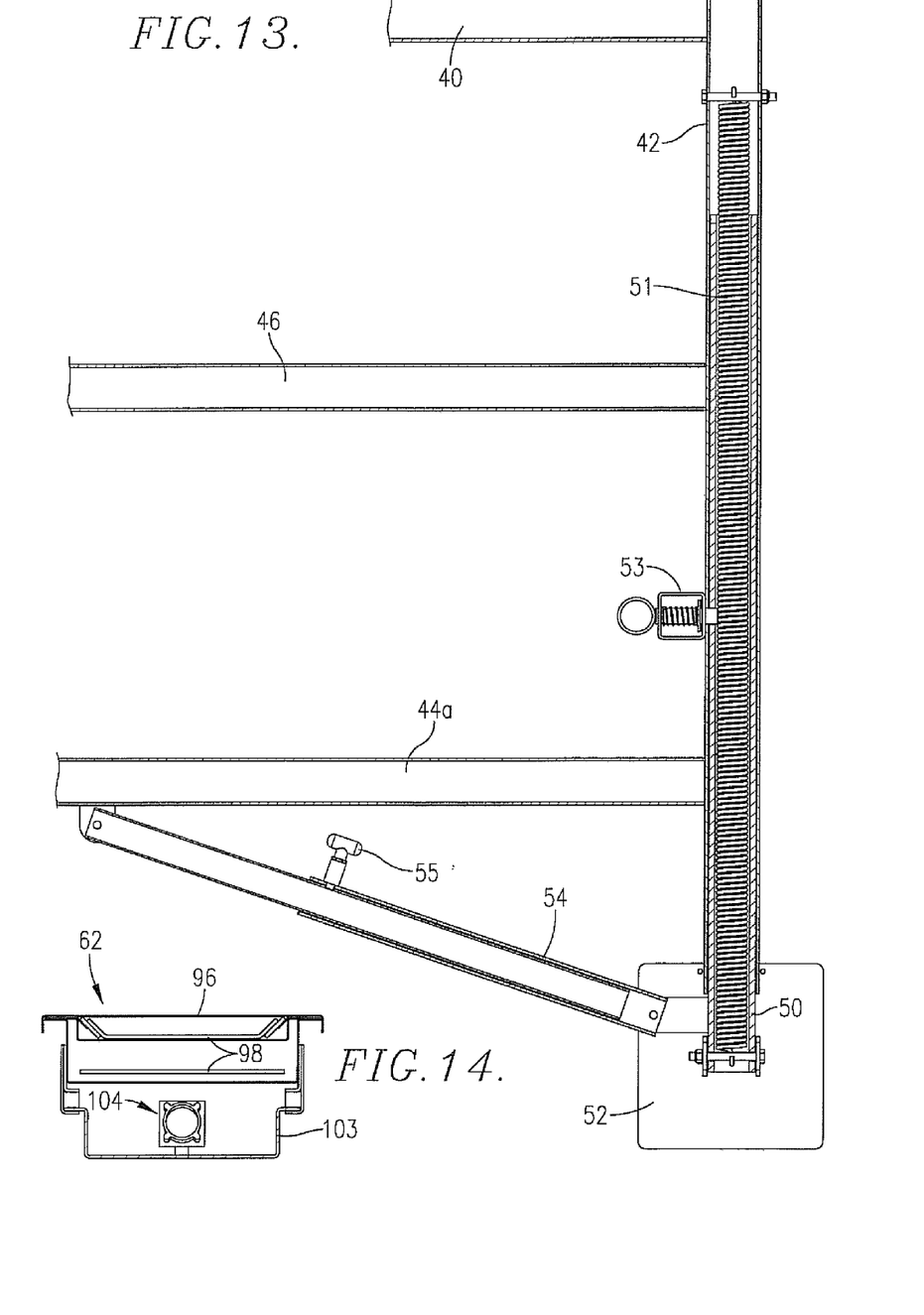
FIG. 13 is a fragmentary, partially in section view of one of the leg assemblies of a bin assembly.
FIG. 14 is a sectional view illustrating the intermediate conveyor of the transport trailer.

In more detail, the seed bin assembly 22 includes a seed bin 26 of generally quadrate configuration, having a top wall 28 with an uppermost seed loading opening covered by a hingedly mounted cover 30, as well as sloped bottom walls 32 leading to an unload opening 34, the latter covered by manually operable slide gate 36. The bin 26 is supported by a frame assembly 38 having uppermost, interconnected frame rails 40 extending about and engaging the bin as shown, and four corner-mounted square tubular leg mounts 42 depending from the rails 40. Four lower frame rails 44, comprising side rails 44a and cross rails 44b, extend between and are connected to the leg mounts 42. Intermediate frame rails 46 also extend along the sides of the bin 26 above the rails 44a and are likewise connected to the mounts 42. A pair of channels 48 are secured to the lower side rails 44a on opposite sides of slide gate 36 as shown. An extendable leg 50 is telescoped within each leg mount 42 and has a lowermost ground-engaging pad 52 pivotally attached to the lower end of the leg 50. A coil spring 51 is located within each leg mount 42 and is connected to the lower end of the leg 50 (FIG. 13), in order to bias the leg upwardly. A spring-loaded leg lock 53 is secured to each mount 42 and is operable to alternately lock the corresponding leg 50 in the retracted and extended positions thereof by engaging an upper notch or a lower aperture in the leg 50. A two-piece, telescoping arm 54 is pivotally secured between each leg 50 and a lower frame side rail 44a, and has a pin-type arm lock 55 for locking the arm 54 in the extended position thereof.

Figure 2:
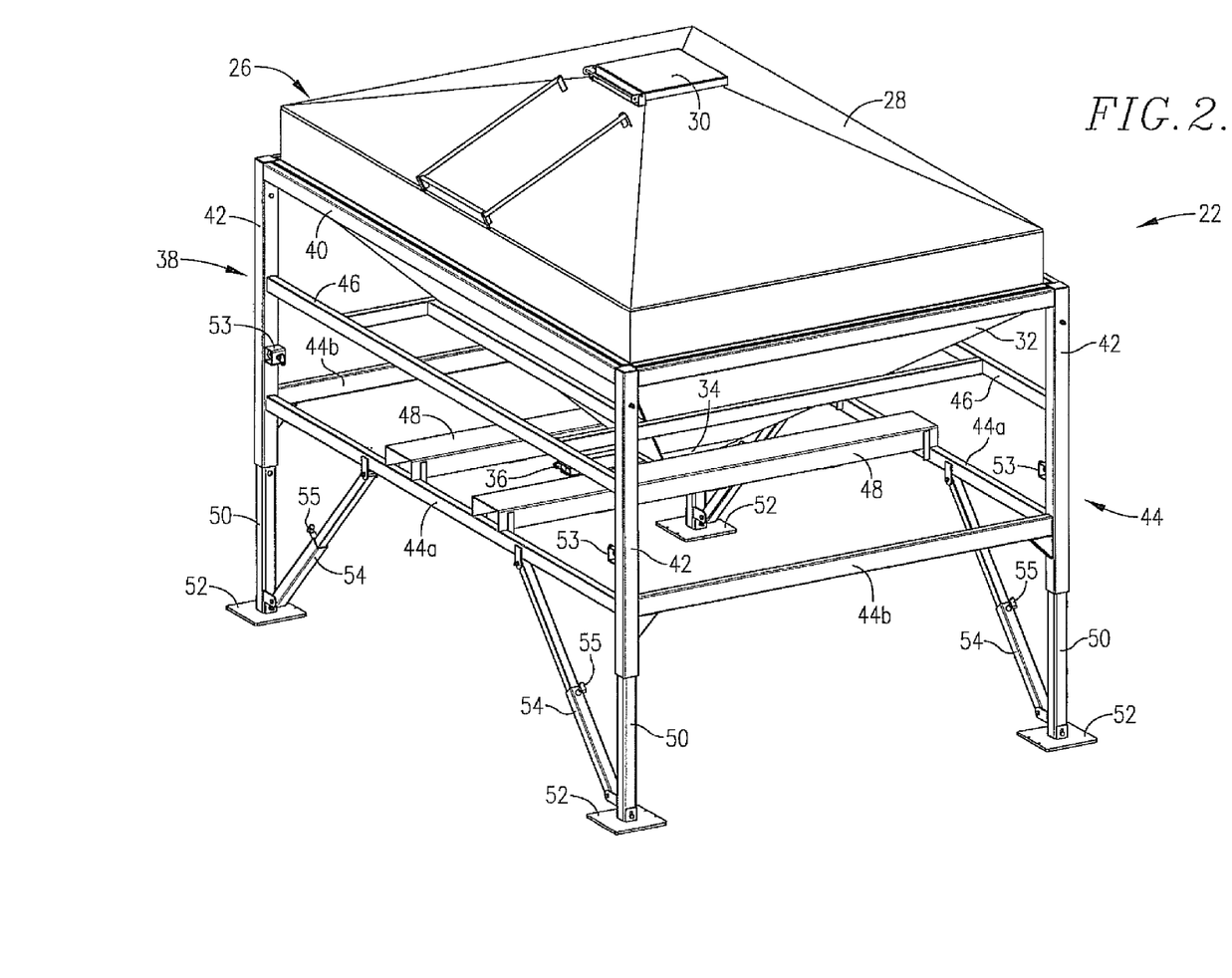
FIG. 2 is a perspective view of a seed bin designed for use with the transport trailer of FIG. 1.

The bin assembly 22 is designed for easy transport from a seed distributor to a farm. In general, the individual bin assemblies, with their legs extended as illustrated in FIG. 2, are filled with seed and a flatbed trailer 56 (see FIG. 3) is backed under the filled bin assemblies beneath the lower cross rails 44b and within the lower side rails 44a. The legs 50 of each bin assembly are next retracted through the action of springs 51, by releasing the locks 53 and 55, thereby lowering the bin assembly onto the trailer 56 with the cross rails 44b engaging the trailer bed. In this condition, the loaded bin assemblies 22 can be readily moved to a drop-off location on a farm. At this point the legs 50 are again extended so that pads 52 engage the earth or support surface, thereby serving to elevate the bin assemblies off of the trailer 56 and allowing the trailer 56 to be driven away from the bin assemblies.

Figure 1:
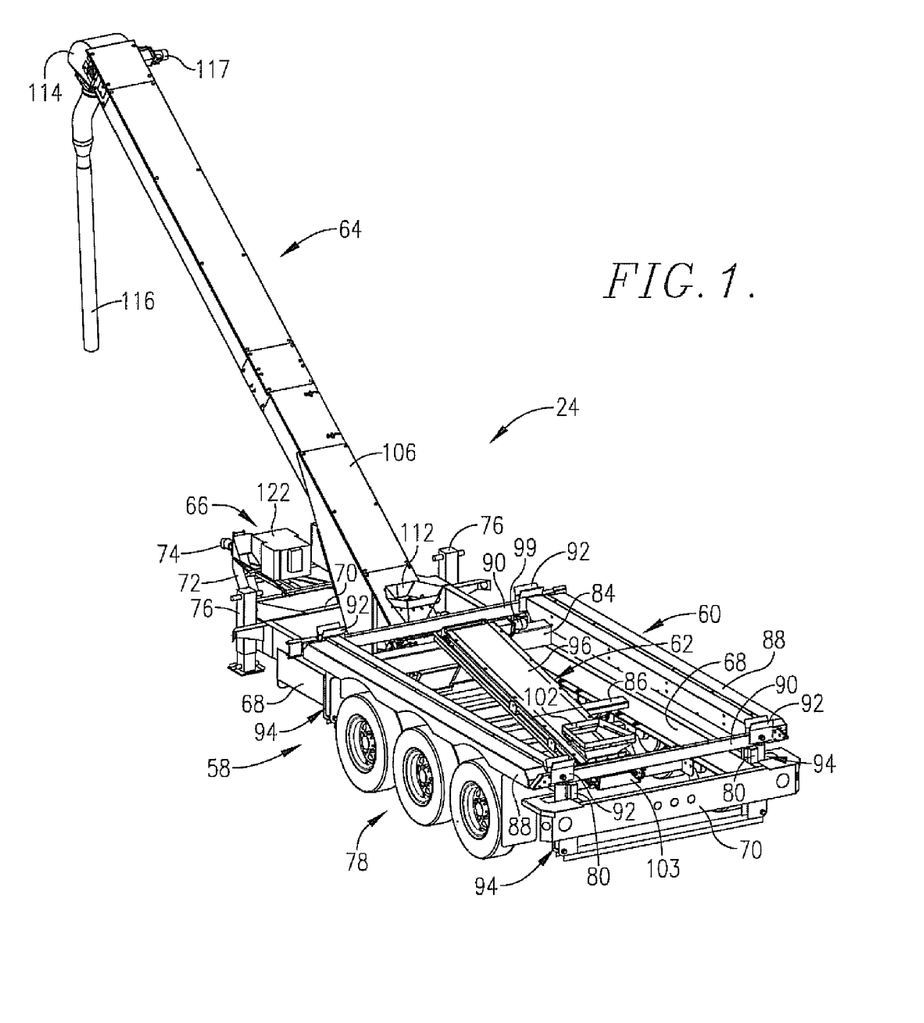
FIG. 1 is a perspective view of a seed bin transport trailer in accordance with the invention.

The trailer 24 broadly includes a wheeled box main frame 58, a box lift frame 60, an intermediate, extendable conveyor 62, a final delivery conveyor 64, and a motor and hydraulic pump assembly 66 mounted on frame 58. The purpose of trailer 24 is to allow a farmer easily engage and transport a full bin assembly 22 to a convenient location, and to allow unloading of the seed into a planter or the like.

Specifically, the frame 58 includes a pair of lower side frames 68 with interconnected fore and aft lower cross frames 70. A generally triangular forward section 72 is secured to the front cross frame 70 and is equipped with a hitch 74 and a pair of outriggers 76. The section 72 also supports the motor and pump assembly 66. Three wheel assemblies 78 are secured to the underside of the lower side frames 68 to allow over-the-road travel of the trailer. A pair of rear supports 80 are secured to the side frames 68 adjacent the aft lower cross frame 70. Likewise, a pair of forward supports 82 (FIGS. 11-12) are secured to the lower side frames 68 ahead of the wheels 78. A conveyor-supporting cross beam 84 extends between and is connected to the upper surfaces of the lower side frames 68 between the wheels 78 and forward supports 82. Another conveyor-supporting cross beam 86 (FIG. 11) is secured to the inboard faces of the lower side frames 68.

Figure 1A:
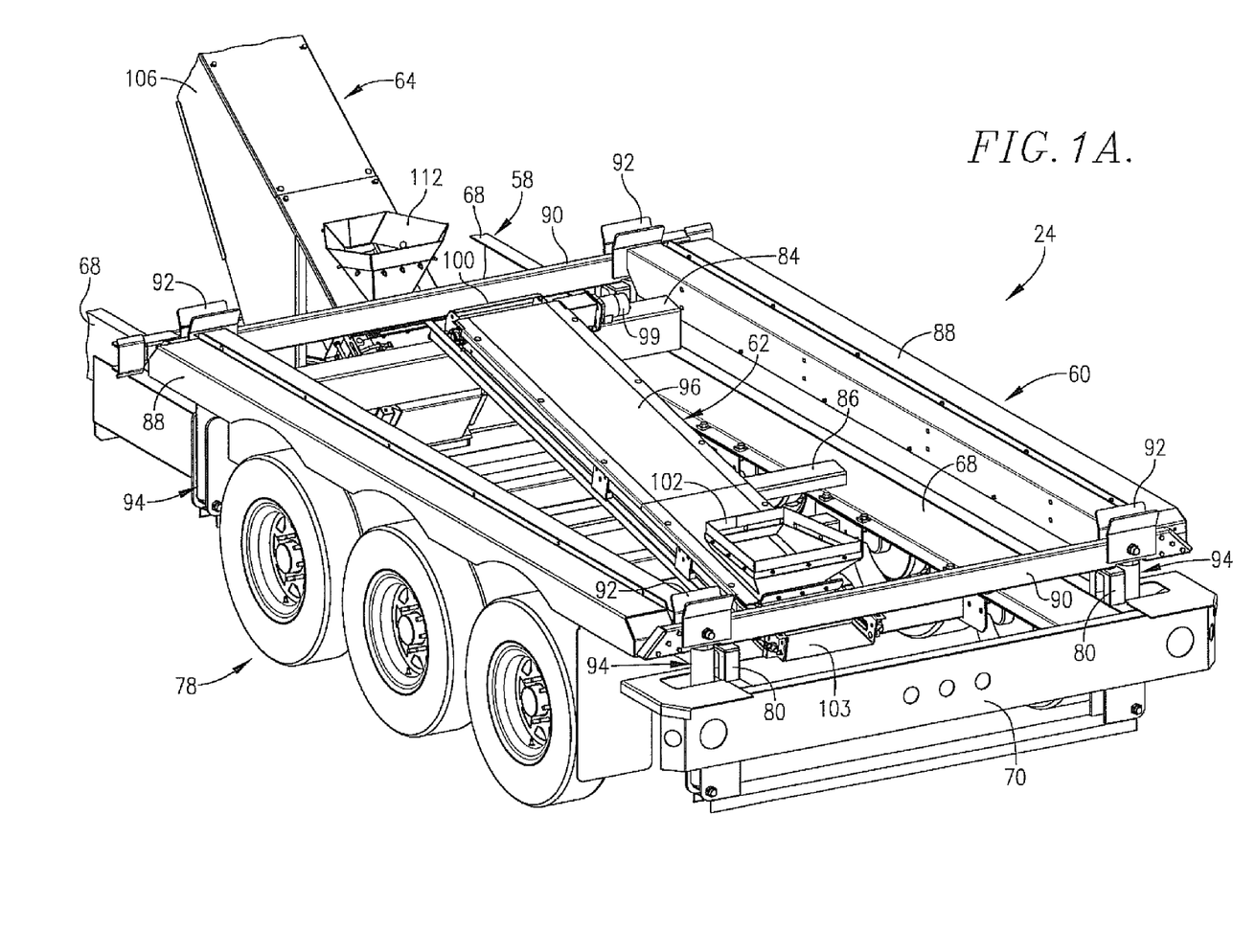
FIG. 1A is an enlarged, fragmentary perspective view of the lift section of the transport trailer illustrated in FIG. 1.

The lift frame 60 includes a pair of elongated side members 88, as well as interconnected, fore and aft cross members 90. The latter are equipped with a pair of spaced apart, upwardly extending frame guide elements 92. The side members 88 are equipped with bin assembly-engaging stops adjacent and outboard of the elements 92, which facilitate proper positioning of a bin assembly on the lift frame. The lift frame 60 in its lowered position rests upon rear and forward supports 80, 82. The lift frame 60 may be selectively elevated by means of four corner-mounted piston and cylinder assemblies 94 respectively connected to the main frame 58 and lift frame 60.

The intermediate conveyor 62 includes an elongated conveyor frame 96 supporting a continuous conveyor belt 98 (FIG. 12) powered by means of hydraulic motor 99. The frame 96 presents a downwardly opening outlet spout 100 at its forward end, and an open-top inlet 102 at the aft end thereof. The frame 96 is supported by an inclined, central slide channel 103 secured to the cross beams 84 and 86. The conveyor 62 may be selectively raised or lowered in a translatory fashion by means of a hydraulic piston and cylinder assembly 104 secured between the underside of frame 96 and the upper end of slide channel 103.

Figure 6:
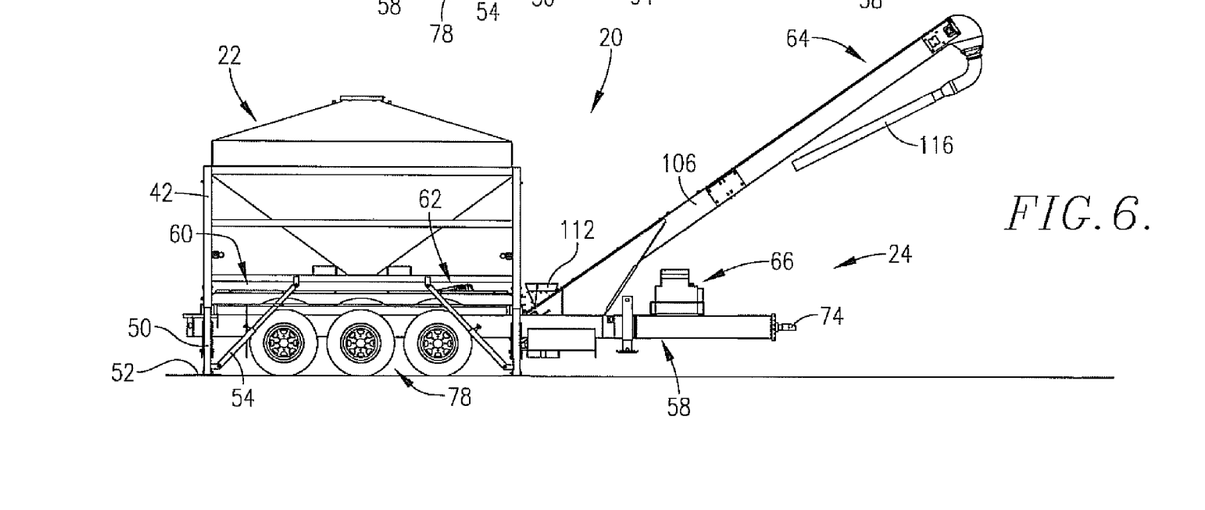
FIG. 6 is a view similar to that of FIG. 5, but illustrating the trailer fully moved under the bin.
Figure 9:
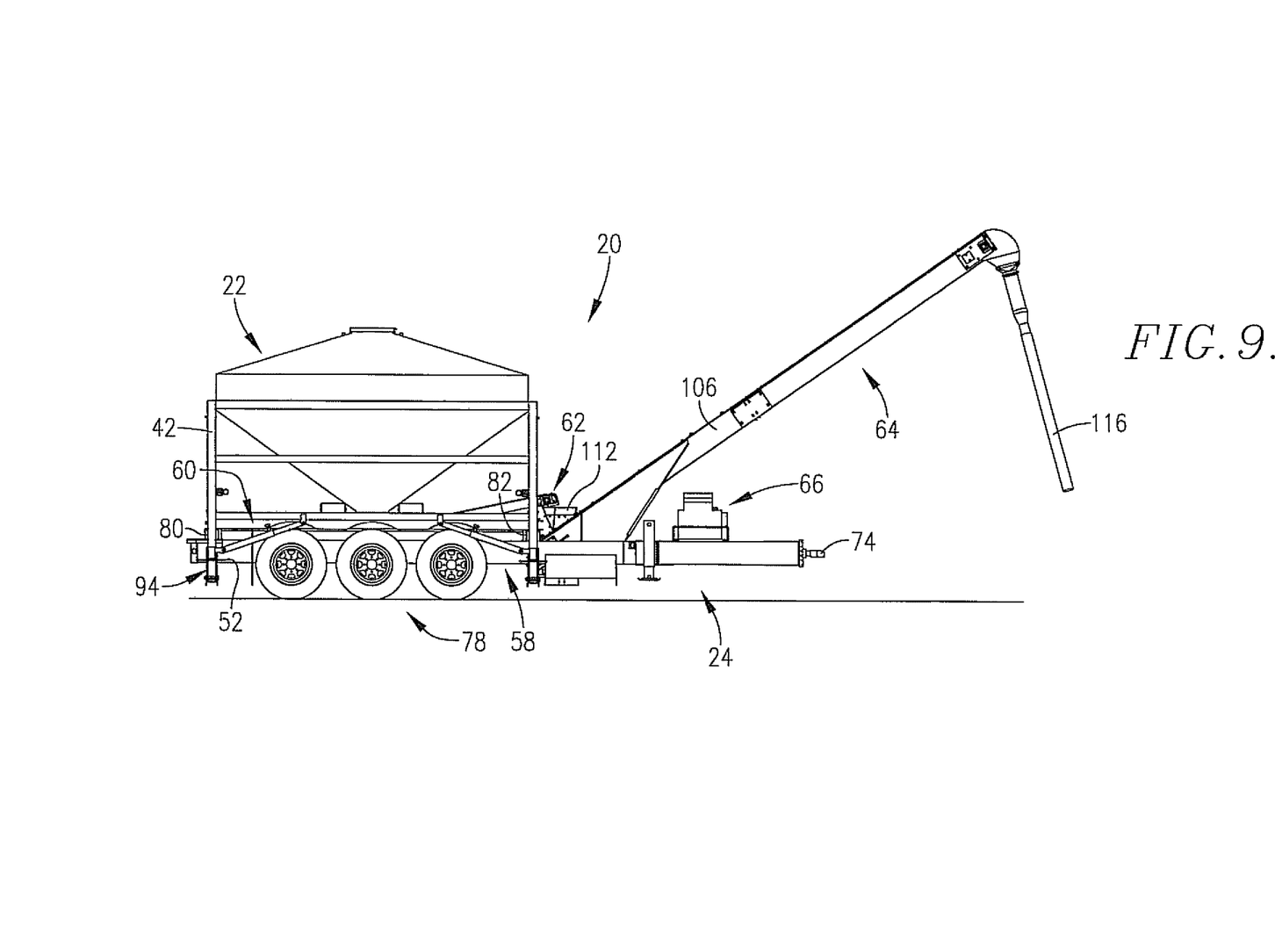
FIG. 9 is a view similar to that of FIG. 8, but illustrating the intermediate conveyor of the trailer elevated in its extended position for unloading of seed from the bin.

The delivery conveyor 64 includes an obliquely oriented and upwardly extending pivotal conveyor frame 106 secured to mainframe 58 by means of lower mounting structure 108 including pivot pin 109. The conveyor frame 106 is selectively swingable about the upright axis defined by pin 109 through the medium of a piston and cylinder assembly 110 pivotally coupled between a crank 111 coupled with pin 109 and conveyor frame 106. The conveyor frame 106 presents a lower inlet 112 and an uppermost, downwardly extending outlet 114. A shiftable tubular spout 116 is pivotally coupled with outlet 114 via a flexible coupling, between a travel position (FIG. 6) and a seed unloading position (FIG. 9). A continuous conveyor belt 118 is housed within the frame 106 and extends between the inlet 112 and the outlet 114; the belt 118 is powered by means of hydraulic motor 117.

The motor and pump assembly 66 itself entirely conventional, and includes a gasoline engine (not shown) operably coupled with a hydraulic power pack 122. The power pack 122 is in turn connected by hydraulic lines (not shown) to the piston and cylinder assemblies 94, 104 and 110 and to hydraulic motors 99, and 117.

Operation

Figure 3:
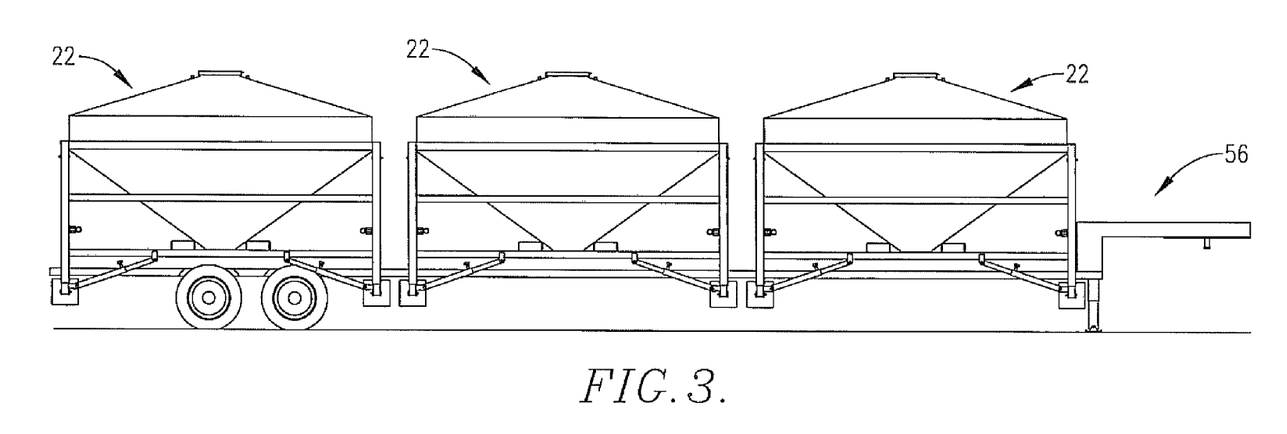
FIG. 3 is a side elevational view of a conventional flatbed truck trailer with three of the seed bins of FIG. 2 thereon.

In practice, a seed distributor would fill one or more of the bin assemblies 22 with seed. This is generally accomplished with the legs 50 of the assemblies 22 lowered and locked in place by means of leg locks 53 and arm locks 55, by introduction of bulk seed through the upper seed bin opening. The flatbed trailer 56 is then backed through one or more of the filled assemblies 22, whereupon the legs 50 thereof are elevated. This involves delatching of the leg and arm locks 53, 55 with lifting of the legs 50 by the springs 51 into the leg mounts 42, followed by relatching the locks 53. This configuration is illustrated in FIG. 3. The loaded bin assemblies 22 can then be driven to a farm. At this point the legs 50 are again extended by detaching of the locks 53 and moving the legs downwardly to contact a support surface, whereupon the locks 53, 55 are latched. This allows the flatbed trailer 56 to be driven away from the now self-supporting bin assemblies 22.

Figure 4:
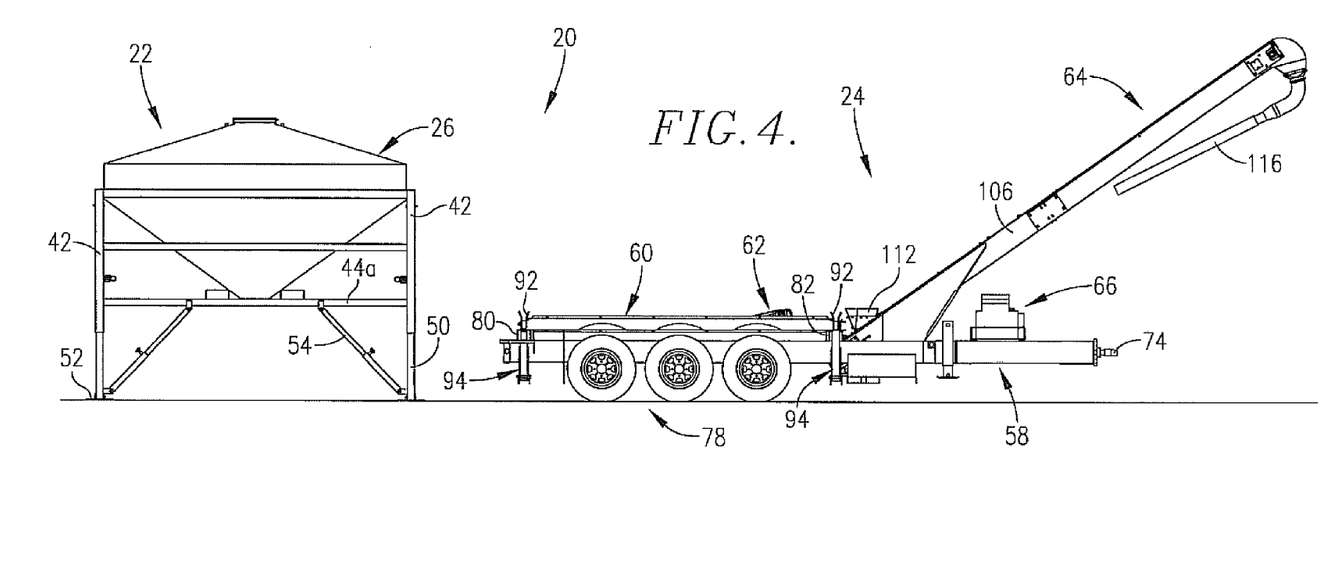
FIG. 4 is a side view of a seed bin with extended legs and resting on a support surface, with the trailer of FIG. 1 located to move under the bin.
Figure 5:
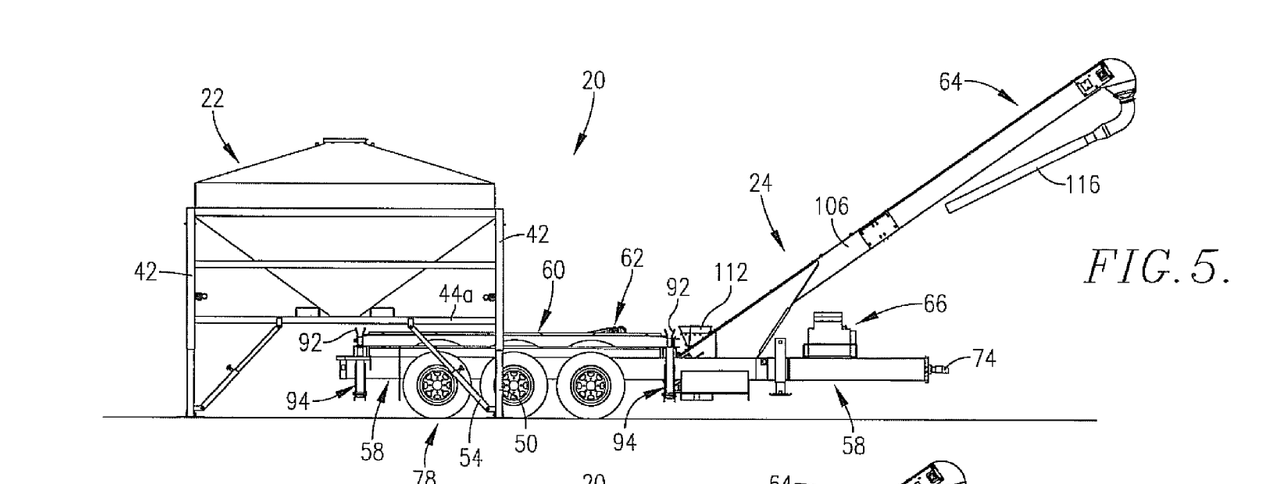
FIG. 5 is a view similar to that of FIG. 4, but showing the trailer moved partially under the bin.
Figure 7:
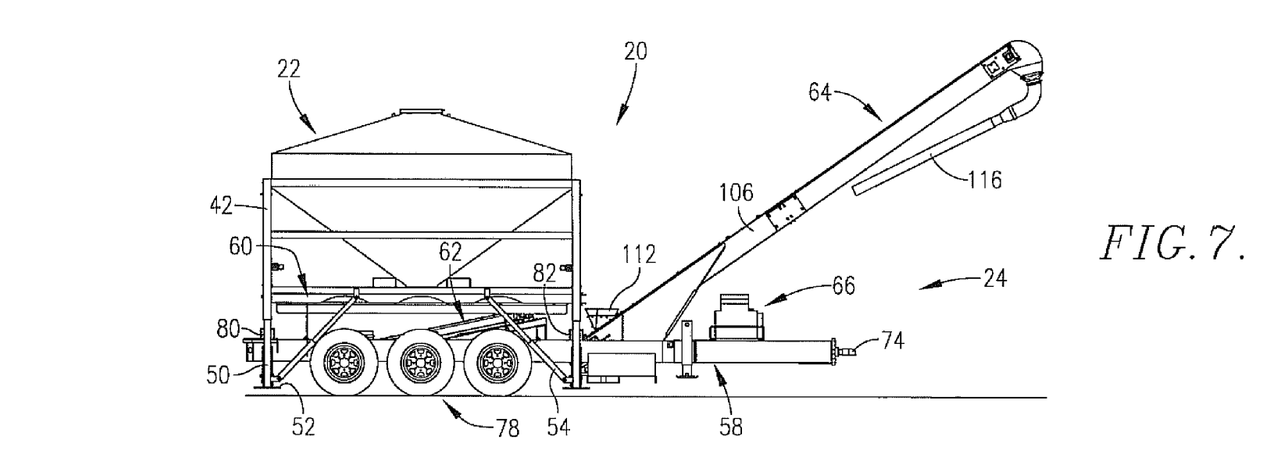
FIG. 7 is a view similar to that of FIG. 6, but illustrating the bin elevated from the support surface by the trailer.
Figure 8:
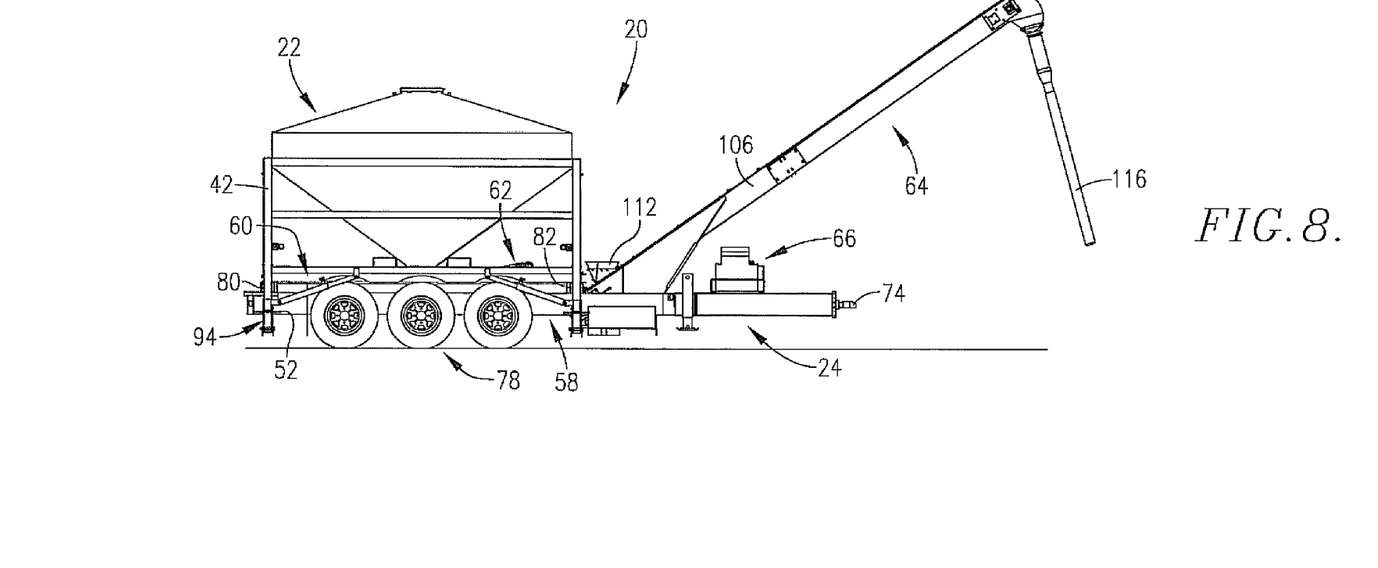
FIG. 8 is a view similar to that of FIG. 7, but illustrating the supported bin with the legs thereof retracted in order to allow transport of the bin.

When the farmer wishes to move one of the bin assemblies 22 to a field or planter, the transport trailer 24 is employed. In the first step (FIG. 4) the trailer 24 is positioned with its aft end between legs 50, parallel with the side frame rails 44a and below and transverse to the cross frames 44b. In this orientation the intermediate conveyor 62 is in its retracted position. The trailer 24 is then backed to a position beneath and below the frame rails 44a, 44b (FIGS. 5 and 6) with the frame guides 92 directly below the ends of cross rails 44b; this positioning is facilitated by the previously described stops which engage the bin assembly. At this point, the lift frame 60 is elevated by actuation of the corner-mounted piston and cylinder assemblies 94 until the guides 92 engage the cross rails 44b and lift the bin assembly 22 off of the ground (FIG. 7). The bin legs 50 are then retracted by delatching the locks 53, 55, so that legs 50 are pulled by the springs 51 into the corresponding mounts 42, and relatching the locks 53. In this condition, the loaded bin assembly 22 may be transported to an unloading site by means of a pickup truck or the like which is coupled to the trailer 24 via hitch 74.

Figure 10:
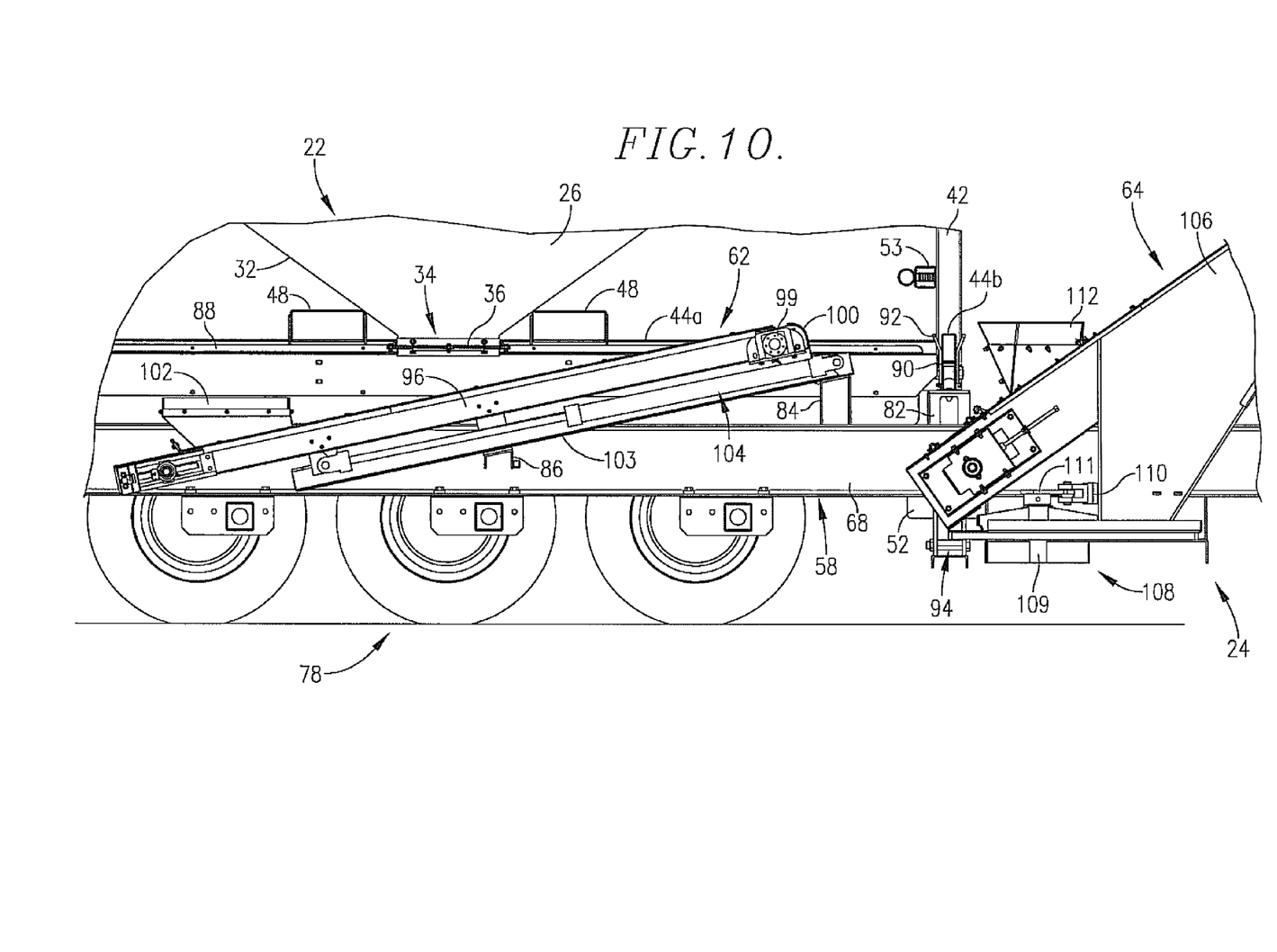
FIG. 10 is an enlarged, fragmentary view illustrating the intermediate conveyor of the trailer in its lowered, bin transport position.
Figure 11:
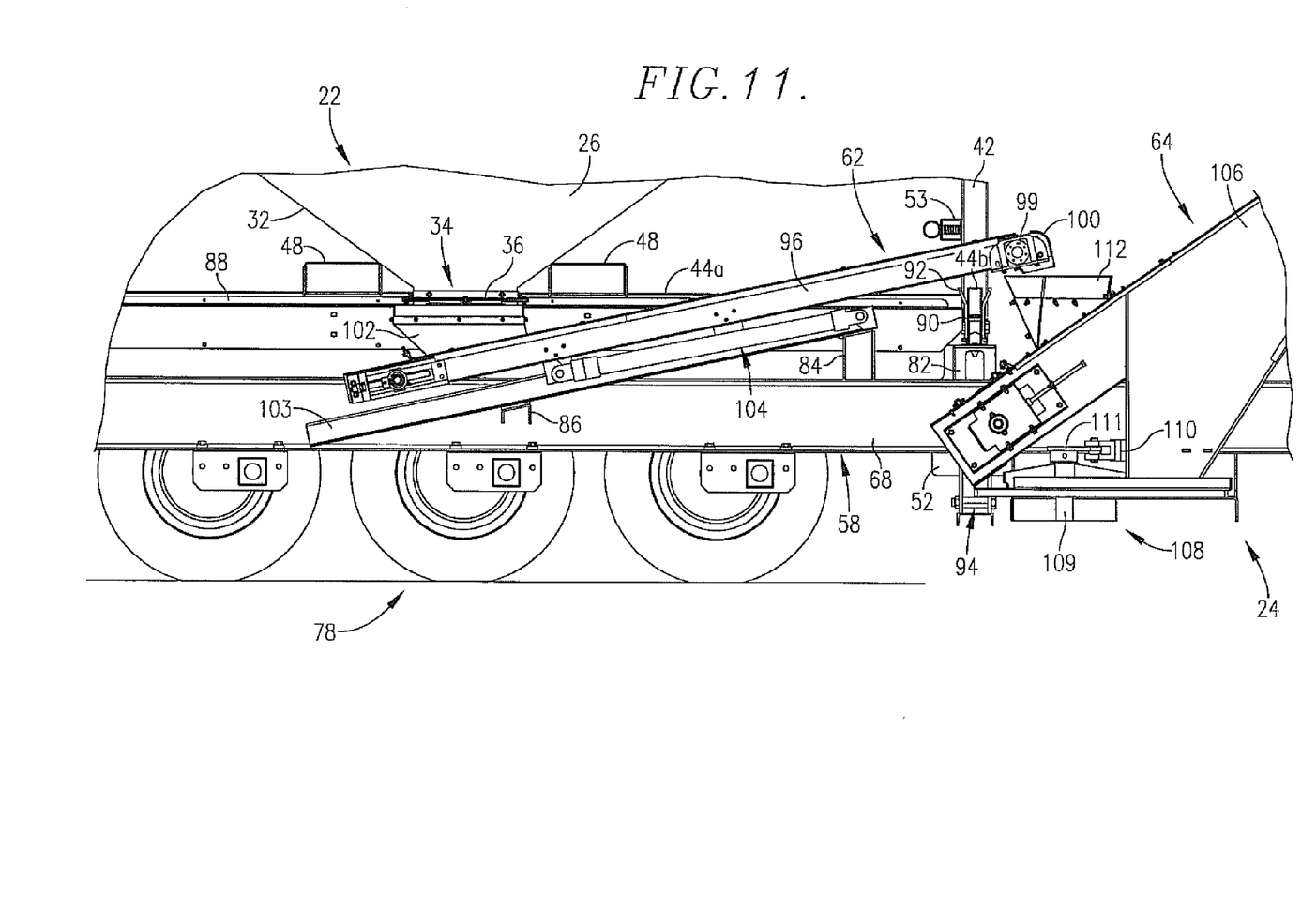
FIG. 11 is a view similar to that of FIG. 10, but depicting the intermediate conveyor in its extended seed unloading position.
Figure 12:
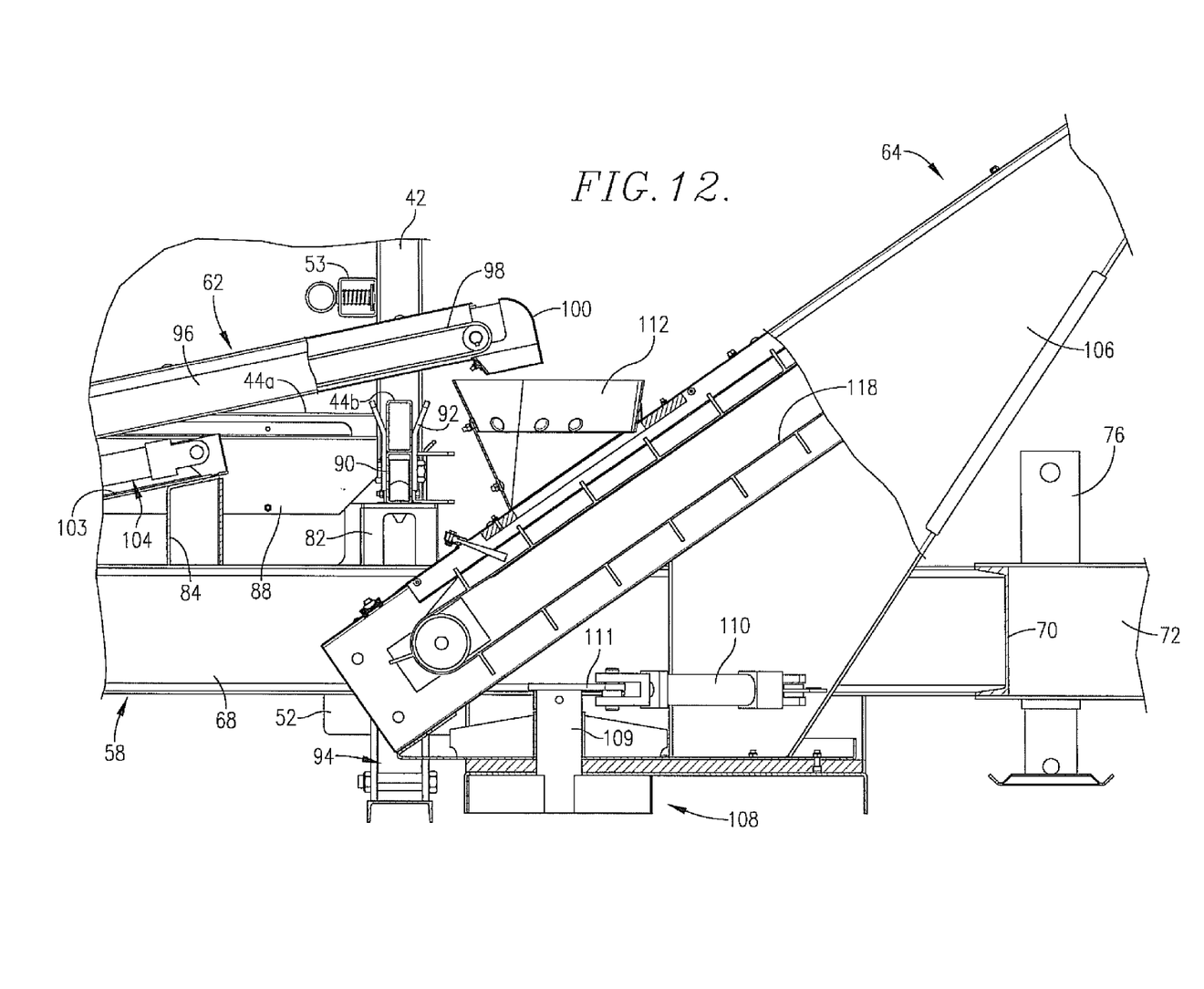
FIG. 12 is an enlarged, fragmentary view illustrating the details of the intermediate and delivery conveyors forming a part of the trailer.

At the unloading site, the pivotal conveyor frame 106 and spout 116 are pivoted to a convenient unloading positions by appropriate actuation of the piston and cylinder assembly 110 and manual movement of the spout, and the intermediate conveyor 62 is moved from its retracted position (FIG. 10) to the extended conveying position thereof (FIG. 11). This involves actuation of the piston and cylinder assembly 104 so as to translate the conveyer frame 96 upwardly and forward of cross rail 44b of bin 26, such that the inlet 102 is directly beneath the unload opening 34 and slide gate 36, and with the outlet spout 100 directly above the inlet 112 of delivery conveyor 64. The intermediate and delivery conveyor belts 98 and 118 are then actuated via hydraulic motors 99 and 117, and the slide gate 36 is opened. This allows seed from bin 26 to descend by gravity through outlet 34 and into inlet 102 for conveyance by intermediate conveyor belt 98 to outlet spout 100. The seed then falls through delivery conveyor inlet 112 is in transferred by conveyor belt 118 to outlet 114. Finally, the seed passes through extended spout 116 into a planter or the like.

Once the seed is fully unloaded from bin 26, the bin assembly 22 may be moved to a pick-up location. Then, the legs 50 are extended and locked as described above, and the trailer 24 is driven away from the empty bin assembly 22. The seed dealer can then pick up the empty bin using flatbed trailer 56.

While the preferred embodiment of the invention has been described in detail, those skilled in the art will appreciate that many details of construction can be chosen while still remaining within the scope of the invention. For example, the seed-holding bin may have a soft, roll-back tarp top wall in lieu of the presently preferred metallic top wall. In like manner, the seed bins may be segmented by internal walls so that a single bin may be used to store and dispense different types of seeds.

I claim:

1. A transport trailer operable to transport a bin assembly filled with particulate material to a use site, and to unload particulate material from the bin assembly at the use site, said bin assembly being separate from the transport trailer and having a bin with a lower particulate outlet, and upright legs supporting said bin on and above a support surface, said transport trailer comprising:

an elongated mobile lower frame having a forward end and a rearward end and wheels operable to support the lower frame on said support surface, said lower frame having a longitudinal axis extending along the length thereof;

a lift frame operably coupled with said lower frame and selectively movable relative to the lower frame and said wheels between a lower position and an elevated position, said lower frame and said lift frame in the lower position thereof movable to a bin-engaging location beneath said bin and between said legs, said lift frame including structure operable to elevate and support said bin assembly when the lift frame is moved to said elevated position thereof at said bin-engaging location, in order to permit transport of said bin assembly to said use site;

a conveyor assembly operable to unload particulate from said bin at said use site, comprising an intermediate conveyor having an inlet and an outlet, and a delivery conveyor having an inlet and an outlet, said intermediate conveyor being elongated and presenting a longitudinal axis substantially parallel with said lower frame longitudinal axis;

shifting structure supporting said intermediate conveyor for selective translatory axial movement of the intermediate conveyor along said longitudinal axis thereof at said use site with the lift frame engaging and supporting said bin, between a retracted lower travel position and an extended unloading position where the intermediate conveyor inlet is below said bin assembly lower outlet and said intermediate conveyor outlet communicates with said delivery conveyor inlet; and pivot structure supporting said delivery conveyor for pivoting movement thereof about an upright pivot axis independent of said intermediate conveyor, said shifting and pivot structures supporting said intermediate and delivery conveyors such that said particulate material at said use site follows a path of travel from said bin along the longitudinal axes of the intermediate and delivery conveyors for delivery of the particulate material forwardly of said forward end of said lower frame.

2. The transport trailer of claim 1, said shifting structure supporting said intermediate conveyor for selective translatory movement thereof in an axial direction along the intermediate conveyor longitudinal axis substantially parallel with said lower frame longitudinal axis, and in an inclined manner such that, when the intermediate conveyor is in said unloading position thereof, the intermediate conveyor outlet end is disposed above said intermediate conveyor inlet end.

3. The transport trailer of claim 1, said lift frame being elongated and presenting fore and aft ends, said lift frame including individual, laterally spaced apart fore and aft guides respectively located proximal to said fore and aft ends and configured to engage and support said bin assembly, said intermediate conveyor support structure operable to move said intermediate conveyor between said lower travel position wherein the outlet of the intermediate conveyor is spaced rearwardly of said fore guide, and said conveying position where said intermediate conveyor outlet is located above and spaced forwardly of said fore guide.

4. The transport trailer of claim 3, said laterally spaced apart fore and aft guides each comprising a transverse frame member forming a part of said lift frame, and a pair of laterally spaced guide elements secured to the corresponding transverse frame member.

5. The combination comprising:
   a bin assembly comprising—
      a particulate bin having an upper inlet and a lower outlet;
      a plurality of spaced apart, upright legs operably secured to said bin to support the bin above and on a support surface;
   a transport trailer separate from said bin assembly and operable to move the bin assembly to a use site, and to unload particulate material from the bin at said use site, said trailer—
      an elongated mobile lower frame having a forward end and a rearward end and wheels operable to support the lower frame on said support surface, said lower frame having a longitudinal axis extending along the length thereof;
      a lift frame operably coupled with said lower frame and selectively moveable relative to said lower frame between a lower position and an elevated position,
      said lower frame and said lift frame in the lower position thereof movable to a bin-engaging location beneath said bin and between said legs, said lift frame including structure operable to elevate and support said bin assembly when the lift frame is moved to said elevated position thereof at said bin-engaging location, in order to permit transport of said bin assembly to said use site;
      a conveyor assembly operable to unload particulate from said bin at said use site, comprising an intermediate conveyor having an inlet and an outlet, and a delivery conveyor having an inlet and an outlet, said intermediate conveyor being elongated and presenting a longitudinal axis substantially parallel with said lower frame longitudinal axis;
      shifting structure supporting said intermediate conveyor for selective translatory axial movement of the intermediate conveyor along said longitudinal axis thereof at said use site with the lift frame engaging and supporting said bin, between a retracted lower travel position and an extended unloading position where the intermediate conveyor inlet is below said bin assembly lower outlet and said intermediate conveyor outlet communicates with said delivery conveyor inlet;
      pivot structure supporting said delivery conveyor for pivoting movement thereof about an upright pivot axis independent of said intermediate conveyor,
      said shifting and pivot structures supporting said intermediate and delivery conveyors such that said particulate material at said use site follows a path of travel from said bin along the longitudinal axes of the intermediate and delivery conveyors for delivery of the particulate material forwardly of said forward end of said lower frame.

6. The combination of claim 5, said shifting structure supporting said intermediate conveyor for selective translatory movement thereof in an axial direction along the intermediate conveyor longitudinal axis substantially parallel with said lower frame longitudinal axis, and in an inclined manner such that, when the intermediate conveyor is in said unloading position thereof, the intermediate conveyor outlet end is disposed above said intermediate conveyor inlet end.

7. The combination of claim 5, said lift frame being elongated and presenting fore and aft ends, said lift frame including individual, laterally spaced apart fore and aft guides respectively located proximal to said fore and aft ends and configured to engage and support said bin assembly, said intermediate conveyor support structure operable to move said intermediate conveyor between said lower travel position wherein the outlet of the intermediate conveyor is spaced rearwardly of said fore guide, and said conveying position where said intermediate conveyor outlet is located above and spaced forwardly of said fore guide.

8. The combination of claim 7, said laterally spaced apart fore and aft guides each comprising a transverse frame member forming a part of said lift frame, and a pair of laterally spaced guide elements secured to the corresponding transverse frame member.

9. A particulate bin assembly comprising:
   a particulate bin having an upper inlet and a lower outlet;
   a frame assembly supporting said bin above a support surface and including a plurality of spaced apart, upright, substantially vertically oriented tubular leg mounts rigidly secured to said bin, and a number of elongated cross rails extending laterally between and rigidly connected to said leg mounts;
   a substantially vertically extending leg telescopically received within each of said leg mounts and including a lowermost pad for engaging said support surface, and an obliquely extending telescopic arm including first and second telescopically interfitted arm sections pivotally coupled to each leg and a cross rail of said frame assembly,
   said legs and arms oriented to form an unimpeded through-space below said bin and between said legs of a size to permit a transport trailer to be positioned within said through-space and between said legs;
   a spring within each leg mount and operably coupled with the associated leg in order to bias the leg to a retracted position,
   each of said legs being substantially vertically shiftable within the corresponding mount between said retracted position and an extended position, said oblique arm pivoting to accommodate such shifting of the leg; and locking structure operable to alternately hold each of said legs in said retracted and extended positions thereof, including a first releasable lock operatively attached to one of said leg mounts and the corresponding leg, in order to selectively lock the corresponding leg relative to the one leg mount, and a second releasable lock operatively attached to one of said oblique arms in order to selectively lock the corresponding first and second arm sections relative to each other.

10. The bin assembly of claim 9, said locking structure including a first releasable lock operatively attached to each of said leg mounts and the corresponding legs, and a second releasable lock operatively attached to each of said oblique arms.

* * * * *